United States Patent Office 2,891,075
Patented June 16, 1959

2,891,075
METHOD OF MAKING 4-METHYL PROGESTERONE

Franz Sondheimer, Rehovoth, and Yehuda Mazur, Tel Aviv, Israel

No Drawing. Application November 20, 1957
Serial No. 697,510

Claims priority, application Mexico November 29, 1956

2 Claims. (Cl. 260—397.3)

The present invention relates to a novel process for the production of cyclopentanophenanthrene compounds.

More particularly the present invention relates to a novel process for the production of the progestational hormone 4-methyl-progesterone.

In accordance with the present invention it has been discovered that a mixture of two isomeric 20-enol acetates of the enolactone of 5,20-diketo-3,5-seco-A-nor-pregnan-3-carboxylic acid (Fujimoto and Prager, J.A.C.S. 75, 3260 (1953), may be reacted with ethyl magnesium bromide to form an addition compound which upon decomposition with dilute mineral acid and hydrolysis with a base gives 4-methyl-progesterone.

The following equation illustrates the present invention:

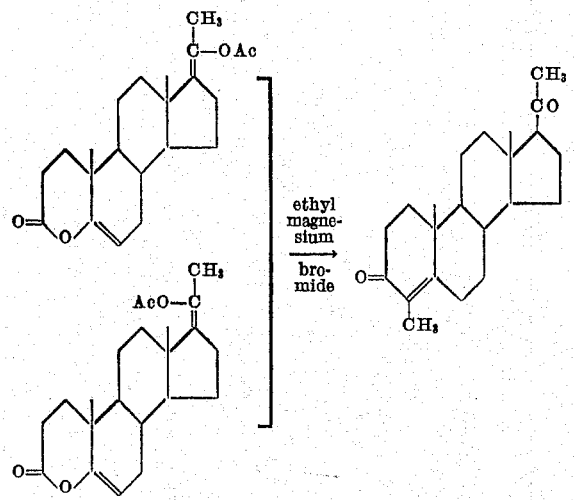

In practicing the process above outlined the 20-enol acetate of the enolactone 5,20-diketo-3,5-seco-A-nor-pregnan-3-carboxylic acid is dissolved in an inorganic solvent; an especially desirable solvent being a mixture of ether and benzene. This solution is then mixed dropwise with stirring and preferably in an atmosphere of nitrogen with an organic solvent, preferably ether, solution of ethyl magnesium bromide. A bulky precipitate is formed and the mixture is then refluxed for substantial period of time of the order of two and half hours. Thereafter the addition product thus formed was decomposed by adding a dilute mineral acid, preferably hydrochloric acid, and the reaction product after extraction with a suitable solvent such as ether was hydrolysed with a base such as methanolic potassium hydroxide. Upon purification there is obtained the desired 4-methyl-progesterone.

The following specific example illustrates the invention but is not intended to limit the same.

Example 1

A solution of 4 g. of the 20-enol acetate of the enolactone of 5,20-diketo-3,5-seco-A-nor-pregnan-3-carboxylic acid in 75 cc. of absolute ether and 75 cc. of anhydrous benzene was mixed dropwise, under stirring in an atmosphere of nitrogen, with an ether solution of ethyl magnesium bromide which had been prepared from 450 mg. of magnesium. A bulky precipitate formed, and under continuous stirring the mixture was refluxed for 2½ hours and after cooling the mixture was decomposed by adding dilute hydrochloric acid. The product was extracted with ether, washed with water, dried and evaporated to dryness. The residue was refluxed with 50 cc. of 3% methanolic potassium hydroxide, under an atmosphere of nitrogen. Ice was added and the mixture was extracted with ether. The ether layer was separated, washed with dilute sodium bicarbonate solution and water, dried over anhydrous sodium sulfate and evaporated to dryness. The residue consisting of 2.8 g. of an oil was dissolved in 25 cc. of a mixture benzene-pentane (9:1) and chromatographed in a column of 60 g. of alumina. The fractions eluted with pentane-benzene (9:1, 250 cc.; 4:1, 200 cc.; 7:3, 500 cc.) afforded 480 mg. of a crystalline residue which was recrystallized three times from ether-methanol. There was thus obtained 255 mg. of the desired 4-methyl-progesterone in crystalline form (needled). The compound showed the following physical constants:

Melting point: 155–157° C.
$[\alpha]_D + 251°$ (c., 12.3).
U.V. $\lambda$, 2510; $\epsilon$ 16000.
I.R. 5.92$\mu$, 6.06$\mu$, 6.25$\mu$.

We claim:
1. A process for the preparation of 4-methyl-progesterone comprising reacting the 20-enol acetate of the enolactone of 5,20-diketo-3,5-seco-A-nor-pregnan-3-carboxylic acid with ethyl magnesium bromide to form an addition product thereof, decomposing the addition product thereof with a dilute mineral acid to form a reaction product and hydrolysing the reaction product with a base.

2. The method of claim 1 wherein the treatment with ethyl magnesium bromide is in a mixture of ether-benzene, the mineral acid is dilute hydrochloric acid and the base is methanolic potassium hydroxide solution.

No references cited.